(No Model.)
G. H. RICE.
CASTER.
No. 324,487. Patented Aug. 18, 1885.
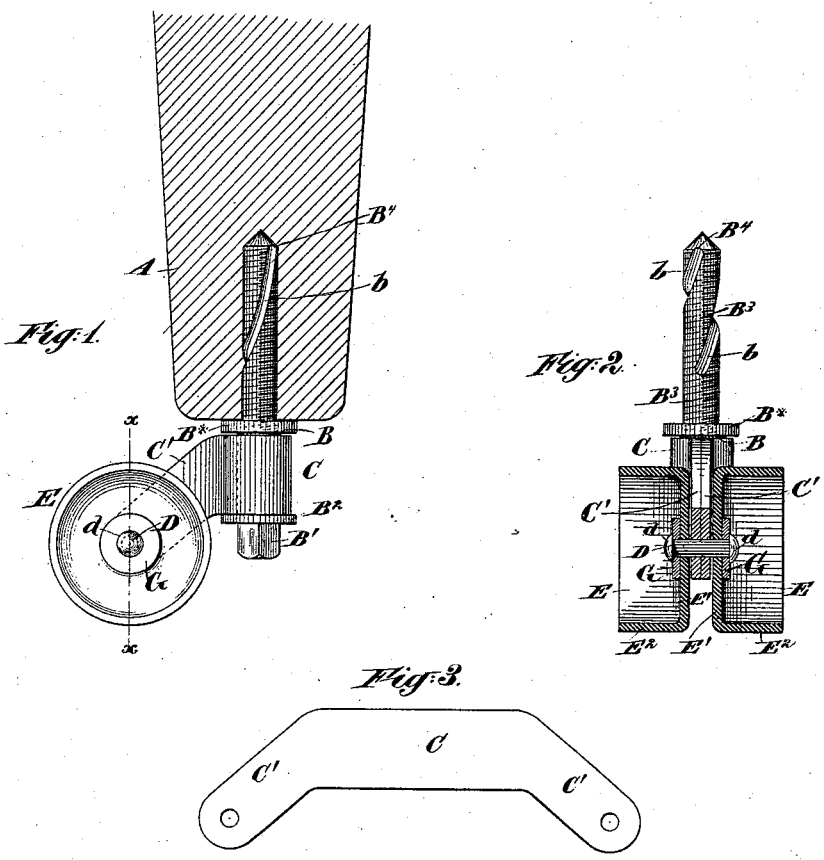
Witnesses:
Charles R. Searle,
M. F. Boyle
Inventor:
George H. Rice
by his attorney
Thomas Drew Stetson

UNITED STATES PATENT OFFICE.

GEORGE H. RICE, OF BROOKLYN, NEW YORK.

CASTER.

SPECIFICATION forming part of Letters Patent No. 324,487, dated August 18, 1885.

Application filed December 20, 1884. (No model.)

*To all whom it may concern:*

Be it known that I, GEORGE H. RICE, of Brooklyn, Kings County, in the State of New York, have invented certain new and useful Improvements in the Construction of Casters for Furniture, of which the following is a specification.

The improved caster is adapted for use in all situations where swiveling casters are required. I will describe it as applied to a table.

The accompanying drawings form a part of this specification, and represent what I consider the best means of carrying out the invention.

Figure 1 is a side elevation of the device, with a section of a portion of the table-leg in which it is inserted. Fig. 2 is a section on the line $x$ $x$ in Fig. 1. Fig. 3 shows the form of the sheet-metal piece for the horn before it is bent.

Similar letters of reference indicate corresponding parts in all the figures where they occur.

A is the lower portion of the leg of a table. I employ a peculiarly-formed pin, B, certain portions of which will be designated, when necessary, by additional marks, as B' B². The lower end is squared, as indicated at B'. Above this is a collar, B². Above the collar B² is a cylindrical portion adapted to serve as a bearing for the horn. Above this is a screw-threaded portion, B³. The upper end is so formed as to present sharp boring-edges B⁴. Cavities $b$ extend from the upper end down a considerable distance into the screw-threaded portion.

The horn is made of a single piece of sheet metal cut and bent. Its central portion, C, embraces closely the smooth portion of the pin B. The ends project outward and downward, forming two corresponding wings, C' C', applied together face to face. A rivet, D, is fixed transversely in the wings C'. This rivet forms bearings for two hollow wheels, E, certain portions of which are distinguished by additional marks, as E' E². The wheels are secured by heading or riveting the ends of the rivet D, as indicated by $d$. A washer, G, is preferably interposed between the rivet-head $d$ and the wheel. The wheels E are struck up from sheet metal of the proper thickness, each being a short hollow cylinder open at one end. The disk E' forms the closed end. The cylindrical portion E² forms the rim or bearing, and has sufficient width to avoid injury to the floor or carpet. The flat end portions or wings C' of the horn are strongly united over their whole adjacent faces by brazing. If the brass protrudes inward into the space for the pin, the latter should be afterward bored or reamed to make a smooth bearing.

My caster is eminently light, strong, efficient, and durable.

B* is a screw-threaded collar or round thin nut tapped to correspond with the screw-threads on the part B³. It is fitted on the pin before its application to the wood, and is screwed down until it meets a slight shoulder on the pin, which arrests it firmly.

My caster is applied by the aid of a bit-stock or analogous revolving key. A square socket in the end of the bit-stock (not represented) engages the squared end B'. The operator applies the device in the proper relation to the table-leg with the table right side up, or nearly so, resting on a work-bench or other suitable support, and allowing a leg to overhang. This position allows the chips or dust of the boring to fall out during the first portion of the work. He applies the device, taking care to plant the point centrally in the bottom of the leg and arranging it exactly in the line of the leg, and rotates it actively, steadying it by grasping the horn or wheels or the whole. The pin bores its own way. The fine chips or dust set free by the cutting-edges B⁴ descend through the channels $b$ and escape until the pin is forced in to such extent as to cover the channels $b$. Thenceforward the dust is compacted or accumulated in the cavities $b$. With the proportions shown, it is practicable to accumulate dust by compacting it in the cavity or cavities $b$ until the pin is sunk, or rather forced upward, into the leg to the proper extent. In effecting this movement the screw-threads on the portion B³ perform an important function by cutting themselves a thread in the interior of the hole bored and gaging the rate at which the pin will move into the leg. These screw-threads also perform an important function in aiding to hold the pin reliably in place after the job is completed.

Modifications may be made in the forms and proportions.

Parts of the invention may be used without the whole.

I can dispense with the brazing of the wings C' and depend upon the stiffness of the metal. I have in practice so made them.

The pin B may be a plain pin driven into the wood.

I claim as my invention—

The pivot-pin B, having one or more cutting-edges, B⁴, a cavity, b, a screw-threaded shank, B³, collar B², and operating-head B', in combination with the horn C C', and two wheels, E E, arranged to serve relatively to each other and to a leg, A, of an article of furniture, as herein specified.

In testimony whereof I have hereunto set my hand, at New York city, this 9th day of December, 1884, in the presence of two subscribing witnesses.

GEO. H. RICE.

Witnesses:
WM. C. DEY,
CHARLES R. SEARLE.